United States Patent [19]
Toh et al.

[11] Patent Number: 5,174,933
[45] Date of Patent: Dec. 29, 1992

[54] METHOD OF AND APPARATUS FOR PRODUCING A PRODUCT WITH A COATING LAYER

[75] Inventors: Kazuhisa Toh, Kure; Shinji Sasaki, Hiroshima; Takami Nakamura, Hatsukaichi; Nobutaka Tanaka, Hiroshima, all of Japan

[73] Assignee: Mazda Motor Corporation, Hiroshima, Japan

[21] Appl. No.: 623,335

[22] Filed: Dec. 6, 1990

[30] Foreign Application Priority Data

Dec. 7, 1989 [JP] Japan .................. 1-318441

[51] Int. Cl.$^5$ ............................................. B29C 45/14
[52] U.S. Cl. .................. 264//40.5; 264/255; 264/328.7; 425/149; 425/150; 425/157; 425/543
[58] Field of Search .............. 264/40.5, 255, 328.7, 264/328.8, 131; 425/130, 149, 150, 157, 160, 158, 562, 543

[56] References Cited

U.S. PATENT DOCUMENTS

| | | | |
|---|---|---|---|
| 4,076,780 | 2/1978 | Ditto | 264/40.5 |
| 4,076,788 | 2/1978 | Ditto | 264/255 |
| 4,082,486 | 4/1978 | Cerano et al. | 425/561 |
| 4,235,833 | 11/1980 | Arnason et al. | 264/255 |
| 4,668,460 | 5/1987 | Ongena | 264/40.5 |
| 4,808,361 | 2/1989 | Castro et al. | 264/40.5 |
| 4,917,840 | 4/1990 | Harada et al. | 264/40.5 |
| 4,923,383 | 5/1990 | Kurmaji et al. | 264/40.5 |
| 5,071,603 | 12/1991 | Kurumaji et al. | 425/150 |

Primary Examiner—Jay H. Woo
Assistant Examiner—Robert B. Davis
Attorney, Agent, or Firm—Fleit, Jacobson, Cohn, Price, Holman & Stern

[57] ABSTRACT

A cavity pressure is sequentially changed, by relatively displacing two mold dies forming a mold cavity, to a molding presure at which a product is molded in the mold cavity, a coating pressure lower than the molding pressure at which fluidized thermosetting plastic material is injected to form a coating layer, a curing pressure between the coating pressure and molding pressure at which the coating layer is cured, and a finishing pressure between the coating pressure and curing pressure at which the coating layer thermosets. The changing of the cavity pressure to the coating pressure is initiated a predetermined time later than a termination of a drop in pressure from the molding pressure due to shrinkage of the product. The changing of the cavity pressure to the curing pressure is initiated at a peak of an increase in relative displacement between the two mold dies caused by injecting a fluidized thermosetting plastic material in the mold cavity.

10 Claims, 3 Drawing Sheets

METHOD OF AND APPARATUS FOR PRODUCING A PRODUCT WITH A COATING LAYER

BACKGROUND OF THE INVENTION

1. Field of the Invention

The present invention relates to a method of and apparatus for producing a product with a coating layer in a mold.

2. BACKGROUND OF THE INVENTION

To provide plastic products molded from what is called a "sheet molding compound" (SMC), such as thermosetting plastic sheet materials, without any surface defects such as convexity or pin holes, it is known to apply a coating either fully or partly to the surface of the molded plastic product in a mold by in-mold coating.

Typically, in an in-mold coating method, a molded product is produced by applying a desired mold die pressure to upper and lower mold dies between which a mold cavity is formed to hold plastic material filled therein. After being impregnated into the cavity with high pressure to cover the surface of the molded product, fluidized plastic material, such as polyester or urethane, is thermoset to form a coating layer. When impregnating the fluidized plastic material in the cavity, the mold cavity pressure applied to the upper and lower dies is rapidly reduced. Such an in-mold coating method is known from, for instance, U.S. Pat. No. 4,668,460, entitled "METHOD OF MOLDING AND COATING A SUBSTRATE IN A MOLD," patented May 26, 1987.

Because of such a rapid reduction in mold cavity pressure, the molded product in the cavity may have a non-uniform density distribution produced over its surface, so as to sticks and digs, resulting in a lack of a precisely smooth surface on the molded product. It is difficult to prevent fluidized plastic material of coating layers for such molded products from sticking and digging on the finish.

The smoothness of the fluidized plastic material of coating layer thermoset largely depends upon the mold cavity pressure upon when thermoset.

SUMMARY OF THE INVENTION

It is, therefore, an object of the present invention to provide a method of producing a molded product with a coating layer in a mold in which a precisely uniform coating layer with a smooth surface is formed on the molded product.

It is another object to provide an in-mold coating apparatus for producing a molded product With a coating layer which has a smooth surface and is uniform in quality over the surface.

A molded product is molded in a mold, comprising two mold dies which forms a mold cavity therebetween, at a molding pressure generated as a mold cavity pressure. In an in-mold coating process, the mold cavity pressure is sequentially changed by causing a controlled relative displacement between the two mold dies to (1) a molding pressure at which a product is molded in the mold cavity, (2) to a coating pressure lower than the molding pressure at which fluidized thermosetting plastic material is injected to form the coating layer, (3) to a curing pressure between the coating pressure and the molding pressure at which the coating layer is cured, and (4) to a finishing pressure between the coating pressure and the curing pressure at which the coating layer is thermoset.

The changing of the mold cavity pressure to the coating pressure from the molding pressure is initiated a predetermined time after a termination of a drop in pressure from the molding pressure, which is caused due to a shrinkage of the molded product in the mold cavity, is detected.

Further, the changing of the mold cavity pressure to the curing pressure from the coating pressure is initiated when a peak of an increase in relative displacement between the two mold dies, which is caused by injecting the fluidized thermosetting plastic material in the mold cavity is detected.

BRIEF DESCRIPTION OF THE DRAWINGS

The above and other objects and features of the present invention will be apparent from the following description of a preferred embodiment thereof when considered in conjunction with the appended drawings, in which.

DETAILED DESCRIPTION OF THE PREFERRED EMBODIMENT

Figure 1:
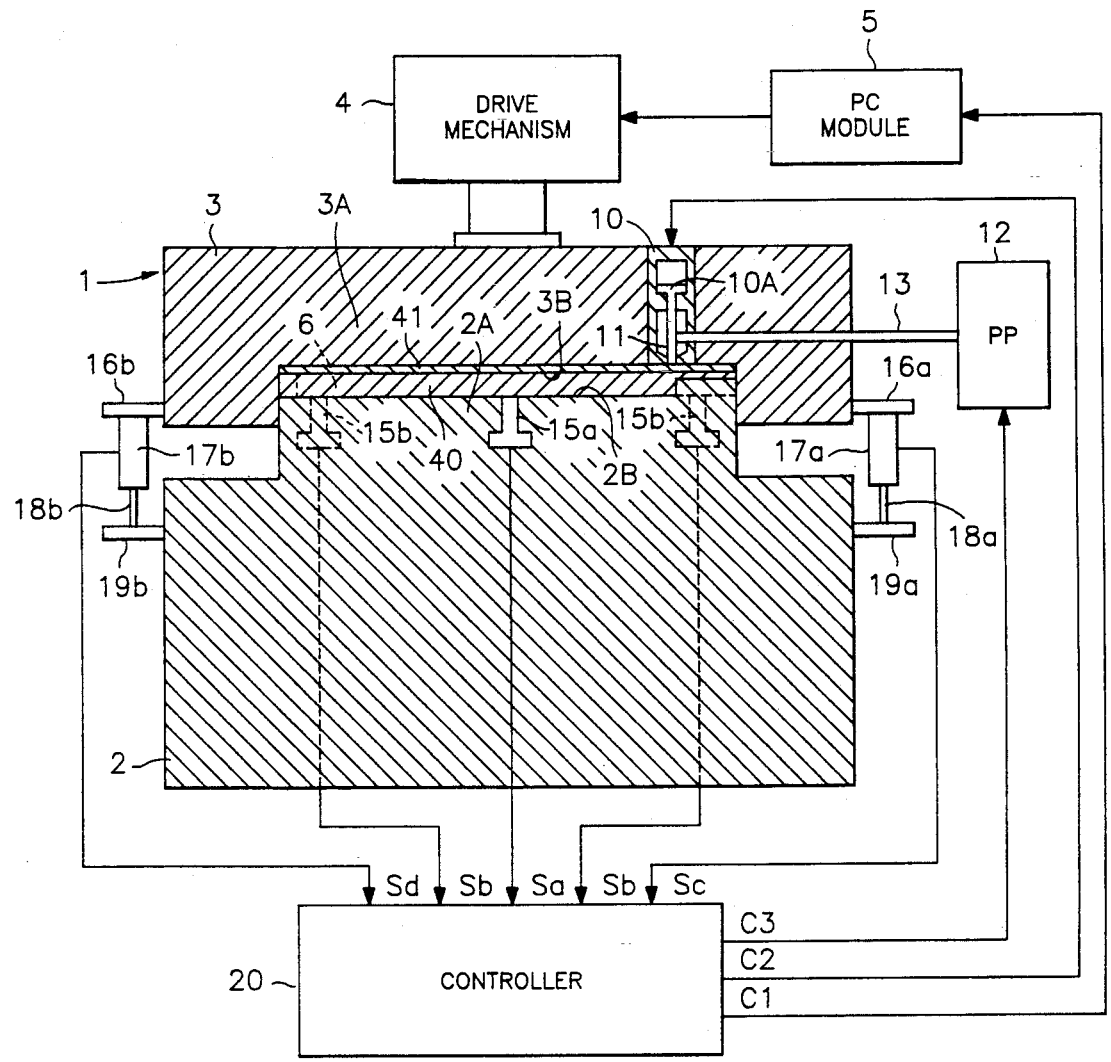
FIG. 1 is a schematic cross-sectional view showing a compression molding apparatus for producing a molded product with a coating layer in a mold.

Referring to the drawings in detail, and in particular, to FIG. 1, a compression molding apparatus for producing a molded plastic product with a coating layer, by in-mold coating in accordance with a preferred embodiment of the present invention, is shown. A compression molding apparatus 1 comprises lower and upper mold dies 2 and 3, forming part of molding means, which are displaceable relative to each other. In particular, the lower mold die 2 is stationed on a base (not shown) such as a floor; the upper mold die 3 cooperates with and is vertically movable toward and away from the lower mold die 2. The lower mold die 2 has a lower mold cavity bearing member half 2A, with an upper surface 2B of a desired shape, formed thereon. Similarly, the upper mold die 3 has an upper mold cavity bearing member half 3A, with a lower surface 3B of a desired shape, with which the lower mold cavity bearing member half 2A meets to form a complete mold cavity 6 of desired shape. The lower and upper mold cavity bearing member halves 2A and 3A are formed with peripheral shearing edges. Although not shown in FIG. 1, the upper and lower mold dies 3 and 2 are, respectively, provided with heating means, of any kind well known to those in the molding art, embedded therein.

Upper mold die 3 is held and driven or moved up and down by a drive mechanism 4, which may include a hydraulic cylinder, forming part of the molding means and producing a relative displacement between the upper and lower mold dies 3 and 2. A pressure control module (PC module) 5 controls a hydraulic pressure for the drive mechanism 4 to adjust the movement, or displacement, of the upper mold die 3 relative to the lower mold die 2 so as to form the mold cavity 6 between the lower and upper cavity bearing member halves 2A and 3A and to change a mold cavity pressure applied to or exerted on the material in the mold cavity 6 between the lower and upper mold cavity bearing member halves 2A and 3A. In order to detect displacement of the upper mold die 3 relative to the lower molding die 2, either one of the upper and lower mold dies 3 and 2, for instance, the upper mold die 3 in this embodiment, is provided with a pair of displacement sensors 17a and 17b secured to opposite sides thereof by brackets 16a and 16b. Each of the displacement sensor 17a or 17b has a movable sensing probe 18a or 18b. The displacement sensors 17a and 17b send appropriate signals Sc and Sd, respectively, when the sensing probes 18a and 18b are moved up and down by brackets 19a and 19b attached to opposite sides of the lower mold die 2.

An injection unit 10 with a vertically movable rod 10A, for discharging or injecting fluidized thermosetting plastic material, such as urethane, into the mold cavity 6, is installed in the upper molding die 3. This injection unit 10 has an injection nozzle 11 that is open to the lower surface 3B of the upper mold cavity bearing member half 3A of the upper mold die 3 and is communicated with an extrusion unit (PP) 12 by way of a pipe 13. The injection unit 10, in particular, the injection nozzle 11 thereof, receives the fluidized thermosetting plastic material supplied from the extrusion unit (PP) 12 through the pipe 13. Extrusion of fluidized thermosetting plastic material into the injection nozzle 11 is allowed when the rod 10A is lifted up and is shut off when the rod 10A is lowered down.

Figure 2:
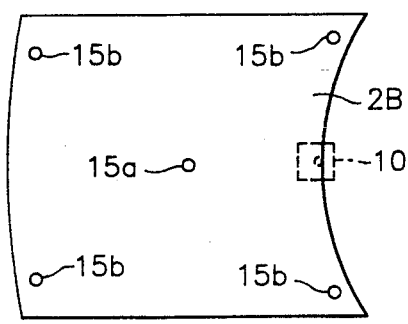
FIG. 2 is an explanatory illustration showing a distribution of pressure sensors embedded in a lower mold die.

As is shown in FIG. 2, either one of the two mold cavity bearing members 2A and 3A, for instance the lower mold cavity bearing member half 2A in this embodiment, is provided with a plurality of built-in pressure sensors, such as a center pressure sensor 15a embedded therein at a center of the lower mold cavity bearing member half 2A and four corner pressure sensors 15b embedded therein at the respective corners of the lower half of mold cavity bearing member half 2A. These pressure sensors 15a and 15b have sensing heads facing the upper surface 2B of the lower mold cavity bearing member half 2A of the lower mold die 2 and detect pressure that the injected material in the mold cavity 6 receives at the center and corners and send appropriate signals Sa and Sb to a controller 20. It is to be noted that the number and distribution of pressure sensors is determined by taking into consideration details of products to be produced.

All of the elements, such as the pressure control module 5, injection unit 10 and extrusion unit (PP) 12, are controlled in operation by control signals C1-C3, respectively, provided by the controller 20 based on the signals Sa-Sd sent from the pressure sensors 15a and 15b and displacement sensors 17a and 17b.

Before molding the molded product and forming an in-mold coating on the molded product, the compression molding apparatus 1 is put in such condition that the upper mold die 3 has been moved up to an initial position, in which the upper mold cavity bearing member half 3A of the upper mold die 3 is located away from the lower mold cavity bearing member half 2A of the lower mold die 2 and the rod 10A of the injection unit 10 is moved down to shut the supply of fluidized thermosetting plastic material into the injection nozzle 11. In this condition, the controller 20 does not provide the pressure control module 5, the injection unit 10 or the extrusion unit (PP) 12 with any signal. After placing a sheet molding compound (SMC), such as a thermosetting plastic sheet, on the upper surface of the lower mold cavity bearing member half 2A of the lower mold die 2, the heating means are activated or energized to heat the sheet molding compound (SMC). The activation of the heating means initiates the compression molding apparatus 1 so that it performs an in-mold coating process.

In the in-mold coating process, the controller 20 first provides the pressure control module 5 with a control signal C1 so as to cause the drive mechanism 4 to lower the upper molding die 3 toward the lower molding die 2. As the upper molding die 3 is lowered, the sheet molding compound (SMC) in the mold cavity 6, formed between the upper and lower mold cavity bearing members halves 3A and 2A, is compressed at a pressure provided as a mold cavity pressure between the upper and lower mold dies 3 and 2. The sheet molding compound is heated and thermoset to form a molded product 40, for instance, a hood of a vehicle the hood of he vehicle is made different in thickness between front and rear sides in the mold cavity 6 by such compression molding.

Figure 3:
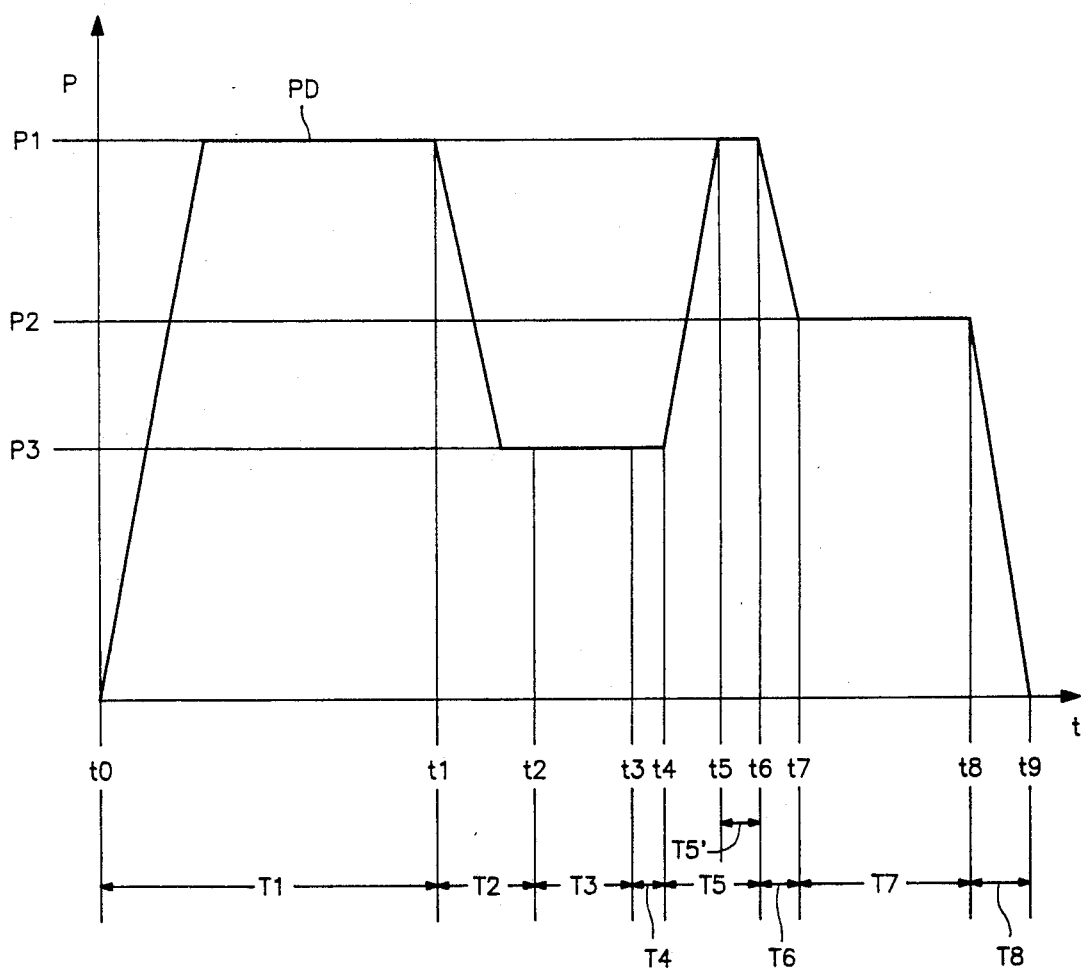
FIG. 3 is a time chart showing changes in a mold cavity pressure.

During and after this compression molding, the controller 20 controls precise movement or displacement of the upper mold die 3 relative to the lower mold die 2 with a varying control signal C1 so as to precisely sequentially change the mold cavity pressure, thereby changing pressure exerted on or received by the sheet molding compound (SMC). A time-pressure schedule for the mold cavity, which is previously designed by taking into consideration of specific dimensional details of the product and stored as an appropriate program for a microcomputer of the controller 20, is exemplary shown by a line PD, in terms of the correlation between time t and pressure P, in FIG. 3.

At the beginning of the in-mold coating process or time t0, the drive mechanism 4 is activated to produce a first relative displacement between the lower and upper mold dies 2 and 3. During the first relative displacement, the upper mold die 3 is gradually lowered and brought into contact with the lower mold die 2 and forms the mold cavity 6 between the upper and lower mold cavity bearing member halves 3A and 2A. At the end of the first relative displacement, the lower and upper mold dies 2 and 3 develop and raise the mold cavity pressure PD to a first or molding pressure P1 necessary to form into a desired shape and maintain the mold cavity pressure PD at the molding pressure P1 until a time t1. This time t1 is very critical and is determined in a manner which will be described later. In a time period T1, between the times t0 and t1, in which the compression force PD has risen to and is maintained at the molding pressure P1, the molded product 40 thermosets and is completed in the mold cavity 6. Although the molded product 40 shrinks upon thermosetting, the time-pressure schedule has been designed to take such shrinkage into consideration.

After maintaining the mold cavity pressure at the molding pressure P1 for the time period T1, a second relative displacement is produced by slightly loosening or lifting up the upper mold die 3 so as to drop the mold cavity pressure PD to a second or coating pressure P3 and maintain it at the coating pressure P3 until a time t4.

At the time t2 while the mold cavity pressure PD is maintained at the coating pressure P3 or after an elapse of a time period T2 from the time t1, the controller 20 provides the extrusion unit 10 and injection unit (PP) 12 with control signals C2 and C3, respectively, and holds the signals C2 and C3 for a time period T3 between times t2 and t3 to activate the injection unit 10 and extrusion unit (PP) 12 for the same time period. As a result, the fluidized thermosetting plastic material, such as urethane, is injected into the mold cavity 6 through the nozzle 11 and covers the molded product 40 during a lapse of the time period T3. At the time t3, the controller 20 removes the control signals C2 and C3. The controller 20 holds the signal C1 to keep the upper molding die 3 maintain the mold cavity pressure PD at the coating pressure P3 for a certain time period T4 after completion of injection of the fluidized thermosetting plastic material and shutting off of the nozzle 11, until the time t4. This time t4 is determined in a manner described later. Maintaining the mold cavity pressure PD at the coating pressure P3 during a lapse of the time period T4 ensures overall coverings of the molded product 40 with a thin layer of fluidized thermosetting plastic material 41.

After the time period T4 or at the time t4 has lapped or at the time t4, the controller 20 causes the drive mechanism 4 to produce third relative displacement by slightly lowering the upper mold die 3 so as to raise the mold cavity pressure PD to a curing pressure, which is equal to the molding pressure P1 in this embodiment, by a time t5. This curing pressure P1 is maintained until a time t6 or for a time period T5' between the times t5 and t6. During a time period T5 between the time t4 and t6, the thin layer of fluidized thermosetting plastic material 41 is cured so as to provide a very smooth surface thereon and uniformity in thickness. The time period T5' for curing is set shorter than a gelation time of the thermosetting plastic material which is necessary for the fluidized thermosetting plastic material to gel.

Immediately after a lapse of the curing time period T5', the controller 20 causes the drive mechanism 4 to produce a fourth relative displacement by slightly lifting up or loosening the upper mold die 3 again to reduce the mold cavity pressure PD to a third or finishing pressure P2 between the first and second pressures P1 and P3 within a time period T6 between times t6 and t7. The upper mold die 3 is kept lifted up to maintain the mold cavity pressure PD at the finishing pressure P2 for a time period T7 between times t7 and t8 during which the thin layer of fluidized thermosetting plastic material 41 completely thermosets as a coating layer with a smooth surface and a uniform thickness.

Finally, at a time t8, the heating means of the upper and lower mold dies 3 and 2 are deactivated or deenergized and the upper mold die 3 is gradually lifted up to remove the mold cavity pressure PD from the molded product 40 in a time period T8 between times t8 and t9. Although the in-mold coating process is thus completed and finished at the time t9, the compression molding apparatus 1 continuously operates to lift the upper mold die 3 up and away from the lower mold die 2 so as to provide a large space between the upper and lower mold dies 3 and 2 sufficient for removing the molded product 40 with the coating layer 41 and ready for putting a sheet molding compound (SMC) on the lower mold cavity bearing member 2A for another in-mold coating.

In order to adjust or vary the control signal C1 to change the mold cavity pressure PD according to the time-pressure schedule previously programmed, the times t1 and t4, for initiating reducing and raising of the mold cavity pressure PD from and to the molding pressure P1, respectively, are determined by actually detecting a pressure acting on the molding product by the pressure sensors 15a and 15b and a relative displacement between the lower and upper mold dies 2 and 3 caused due to the injection of fluidized thermosetting plastic material by the displacement sensor 17a and 17b, respectively.

Figure 4:
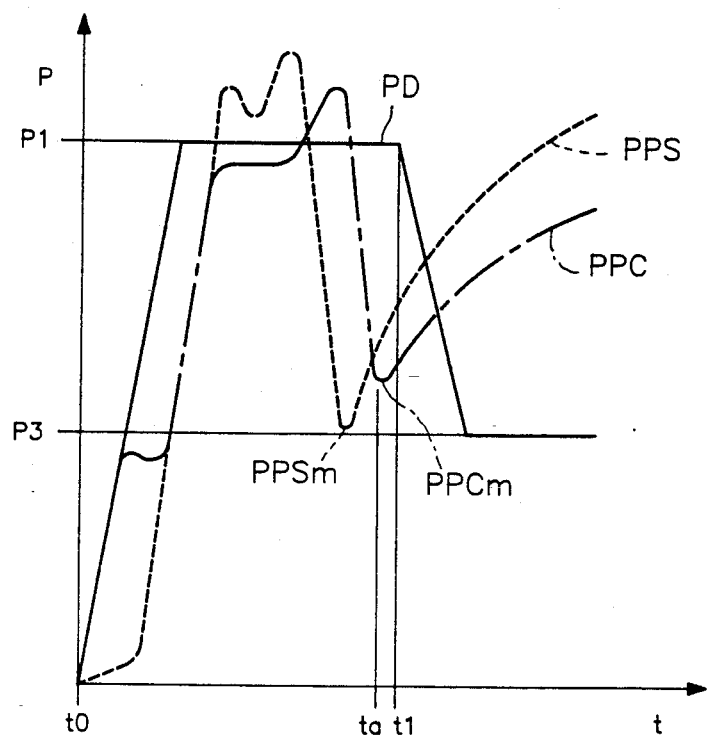
FIG. 4 is an explanatory diagram showing a determination of a time at which the mold cavity pressure is changed to a coating pressure.

Signals Sa and Sb, provided by the pressure sensors 15a and 15b, represent pressure received by the sheet molding compound (SMC) in the mold cavity 6 and change with time as shown in FIG. 4 when forming the molded product 40 by compression molding. In FIG. 4 which depicts the correlation between time and pressure, a change in pressure at the center or the corners of the sheet molding compound (SMC) is shown by lines PPC or PPS, respectively, which is detected in the form of a change in intensity of the signal Sa or Sb by the center pressure sensor 15a or the corner pressure sensors 15b, respectively. When the upper and lower mold dies 3 and 2 are brought into sufficient contact with each other to develop a mold cavity pressure PD equal to the molding pressure P1, the pressures PPC and PPS at the center and corners of the sheet molding compound (SMC) reach the molding pressure P1 slightly later than the mold cavity pressure PD. Once reaching the molding pressure P1, the pressures PPC and PPS, after rising beyond the molding pressure P1, rapidly drop to minimum pressures PPCm and PPSm between the molding pressure P1 and the coating pressure P3 and then rise again. This is because, the sheet molding compound (SMC) shrinks as it thermosets. The drops in pressure PPC and PPS to the minimum pressure PPCm or PPSm depend upon the designed dimensions of the molded product and may or may not occur at the same time. Because there is a difference in time between the pressures PPC and PPS dropping to the minimum pressures PPCm and PPSm and the sheet molding compound (SMC) completely thermosets and shrinks at a later time between the two, the later time ta should be adopted to determine the time t1. That is, the controller 20, when receiving signals Sa or Sb representing the minimum pressure at the later time ta, sets the time t1 to a certain time after the adopted time ta according to the programmed sequence. Because reducing of the mold cavity pressure PD to the pressure P3 is initiated at the time t1 a certain time later than the time ta at which the sheet molding compound (SMC) completely thermosets and shrinks to provide a desired dimensions of the molded product 40, the molded product 40 is held in the cavity 6 without any deterioration of surface quality, such as an ununiformity in density over the surface and surface unevenness.

Figure 5:
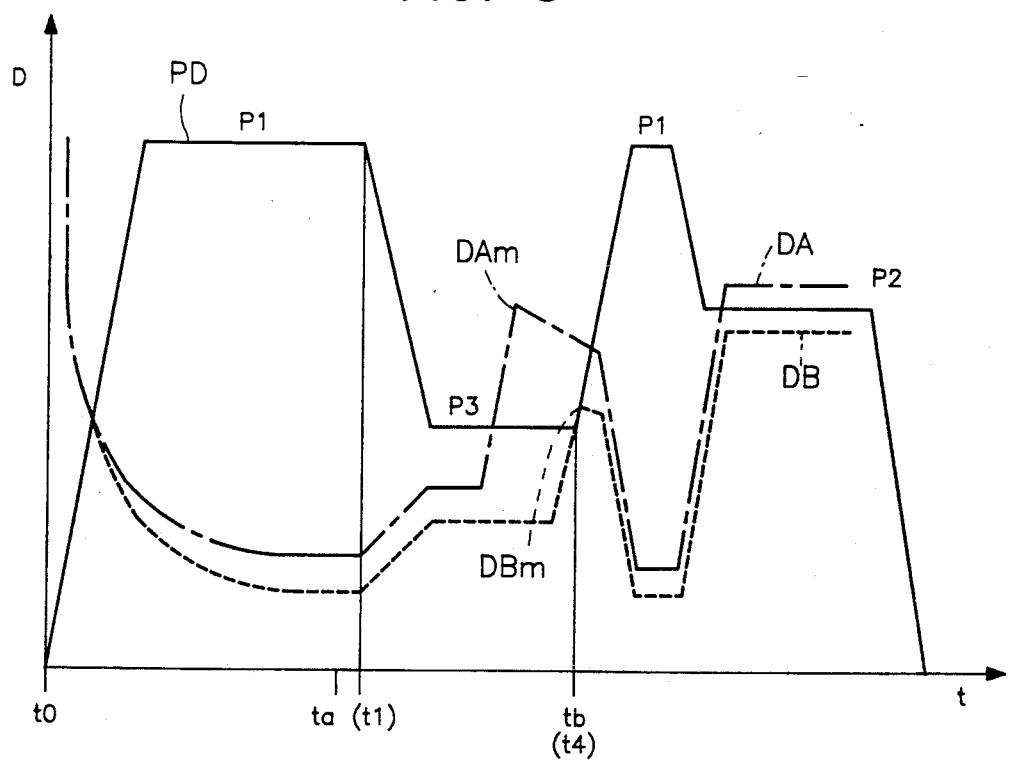
FIG. 5 is an explanatory diagram showing a determination of a time at which the mold cavity pressure is changed to a curing pressure.

The determination of the time t4, at which the rising of the mold cavity pressure PD toward the curing pressure P1 is initiated, is made based on signals Sc and Sd provided from the displacement sensors 17a and 17b. The signals Sc and Sd represent displacements of the opposite sides of the upper molding die 3, respectively, from their initial position with respect to time as shown in FIG. 5 showing the correlation between displacement and time. Changes in relative displacement of the opposite sides of the upper mold die 3 are shown by lines DA and DB which are detected in the form of change in intensity of the signals Sc and Sd from the displacement sensor 17a and 17b, respectively.

When the fluidized thermosetting plastic material is injected into the mold cavity 6 and covers the surface of the molded product 40, the upper mold die 3 is very slightly forced up to maximum displacements DAm and DBm according to the dimensions of the in-mold coating layer which, in this embodiment, is differently designed between the opposite sides. Because there is a time difference between the displacements DA and DB to the maximum displacements DAm and DBm and it can be considered that the thin layer of fluidized thermosetting plastic material 41 completely covers the molded product 40 at different times between the opposite sides, a later time tb between the two at which the maximum displacements DAm and DBm are developed should be adopted to determine the time t4. The controller 20, when receiving the signals Sc and Sd from the displacement sensors 17a and 17b, respectively, representing the maximum displacements, sets the later time tb as the time t4. That is, the controller 20, as soon as it receives the signal Sc or Sd representing the later one of maximum displacements, initiates the lowering of the upper mold die 3 to raise the mold cavity pressure PD to the pressure Pl.

It is to be understood that although the invention has been fully described in detail with respect to a preferred embodiment thereof, various other embodiments and variants are possible which fall in the scope and spirit of the invention, and such embodiments and variants are intended to be covered by the following claims.

What is claimed is:

1. A method of producing a product with a coating layer applied over a surface of the product in a mold having two mold dies which are displaceable relative to each other so as to change a mold cavity pressure therebetween, the method comprising the steps of:
   producing a mold cavity pressure equal to a molding pressure, at which the product is formed in the mold cavity, between the two mold dies;
   detecting a termination of a drop in pressure, caused by the product molded in said mold cavity, below said molding pressure;
   reducing said mold cavity pressure from said molding pressure to a coating pressure, at which the coating layer is formed, after said termination of said drop in pressure is detected, and maintaining said mold cavity pressure at said cavity pressure;
   injecting a fluidized thermosetting plastic material into said mold cavity which maintaining said mold cavity pressure at said coating pressure;
   detecting a termination of a relative displacement between the two mold dies due to injection of said fluidized thermosetting plastic material;
   raising said mold cavity pressure from said coating pressure to a curing pressure when said termination of said relative displacement is detected and maintaining said mold cavity pressure at said curing pressure for a curing time for curing the coating layer;
   reducing said mold cavity pressure from said curing pressure to a finishing pressure; and
   thermosetting said fluidized thermosetting plastic material to finish the product with the coating layer at said finishing pressure in said mold cavity.

2. A method as recited in claim 1, wherein reduction of said mold cavity pressure to said coating pressure is initiated a predetermined time after said termination of said drop in pressure.

3. A method as recited in claim 1, wherein raising of said mold cavity pressure to said curing pressure is initiated a predetermined time after said termination of said relative displacement.

4. A method as recited in claim 1, wherein said finishing pressure is between said molding pressure and said coating pressure.

5. A method as defined in claim 1, wherein said curing time is shorter than a gelation time of said fluidized thermosetting plastic material.

6. A compression molding apparatus for producing a product with a coating layer applied over a surface of the product in a mold, said apparatus comprising:
   compression molding means, comprising two mold dies, for forming a mold cavity therebetween, said two mold dies being displaceable relative to each other so as to change a mold cavity pressure;
   injection means for injecting a fluidized thermosetting plastic material of the curing layer in said mold cavity,
   pressure sensing means embedded in either of the two mold dies for detecting a peak of a drop in pressure in the product and providing a signal representative of said peak of said drop;
   displacement sensing means disposed between said two mold dies for detecting a peak of a relative displacement between said two mold dies caused by injecting said fluidized thermosetting plastic material in said mold cavity and providing a signal representative of said peak of said relative displacement; and
   control means for changing said mold cavity pressure, lower than said molding pressure, once a predetermined time period has lapsed, said predetermined time period being determined so as to expire a certain time after said signal representative of said peak of said drop in pressure has lapsed, said fluidized thermosetting plastic material being injected, at said coating pressure, by said injection means so as to form the coating layer, said control means then changing said mold cavity pressure to a curing pressure, no higher than said molding pressure, at which the coating layer is cured after receiving said signal representative of said peak of said relative displacement, and from said curing pressure to a finishing pressure, between said coating pressure and said curing pressure, at which the coating layer is thermoset.

7. A compression molding apparatus as recited in claim 6, and further comprising heating means for heating said plastic material incorporated in at least one of said two mold dies.

8. A compression molding apparatus as cited in claim 6, wherein said compression molding means includes hydraulic drive means for displacing at least one of said two mold dies.

9. A compression molding apparatus as recited in claim 8, wherein said control means controls hydraulic pressure for said hydraulic drive means so as to cause relative displacement of said two mold dies.

10. A compression molding apparatus as recited in claim 6, wherein said injection means includes an injection nozzle built in either one of said two mold dies.

* * * * *